United States Patent
Boyd et al.

(10) Patent No.: US 10,970,673 B2
(45) Date of Patent: *Apr. 6, 2021

(54) BILL OF MATERIAL SYNCHRONIZATION

(71) Applicant: International Business Machines Corporation, Armonk, NY (US)

(72) Inventors: Alan Potter Boyd, Boynton Beach, FL (US); Amaresh Rajasekharan, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/122,493

(22) Filed: Sep. 5, 2018

(65) Prior Publication Data

US 2019/0005443 A1    Jan. 3, 2019

Related U.S. Application Data (62) Division of application No. 12/648,034, filed on Dec. 28, 2009, now Pat. No. 1,040,588.

(51) Int. Cl.
*G06Q 10/08*    (2012.01)
*G06Q 10/06*    (2012.01)
*G06Q 50/04*    (2012.01)

(52) U.S. Cl.
CPC .......... *G06Q 10/087* (2013.01); *G06Q 10/06* (2013.01); *G06Q 10/0875* (2013.01); *G06Q 50/04* (2013.01); *Y02P 90/30* (2015.11)

(58) Field of Classification Search
None
See application file for complete search history.

(56) References Cited

U.S. PATENT DOCUMENTS

| 5,515,269 A | 5/1996 | Willis et al. |
| 5,991,751 A | 11/1999 | Rivette |

(Continued)

FOREIGN PATENT DOCUMENTS

| JP | 2005275597 | 6/2005 |
| TW | I230882 | 4/2005 |

OTHER PUBLICATIONS

Lianjun An et al, On Developing System Dynamics Model for Business Process Simulation, Proceedings of the 2005 Winter Simulation Conference, IBM T.J. Watson Research Center, Yorktown Heights, NY 10598.

(Continued)

*Primary Examiner* — Fateh M Obaid
(74) *Attorney, Agent, or Firm* — Fabian VanCott; Steven L. Nichols (57) ABSTRACT

A method performed by a computing system configured to synchronize a source bill of material with a target bill of material includes, in response to a determination by the physical computing system that a revision has been applied to a source node from a tree structure representing the source bill of material since a corresponding target node from a tree structure representing the target bill of material was last updated, calculating a change from the source node to the target node with the physical computing system, and updating, with the physical computing system, the target node with the revision if the calculated change matches a stored difference derived from a revision history associated with the source bill of material.

15 Claims, 8 Drawing Sheets

(56) References Cited

U.S. PATENT DOCUMENTS

| | | |
|---|---|---|
| 6,094,654 A | 6/2000 | Van Huben et al. |
| 6,202,070 B1 | 7/2001 | Nguyen et al. |
| 7,006,988 B2 | 2/2006 | Lin |
| 7,392,255 B1 * | 6/2008 | Sholtis ............... G06F 16/256 |
| 7,490,112 B1 | 2/2009 | Suresh |
| 7,512,553 B2 | 3/2009 | Chidiac |
| 7,526,486 B2 | 4/2009 | Cushman |
| 7,702,636 B1 * | 4/2010 | Sholtis ............... G06F 16/256 707/999.1 |
| 7,854,376 B2 | 12/2010 | Oberoi |
| 8,301,522 B2 | 10/2012 | Sun |
| 8,838,593 B2 | 9/2014 | Wroblewski |
| 2004/0024662 A1 | 2/2004 | Gray |
| 2004/0181554 A1 | 9/2004 | Heckerman |
| 2006/0053097 A1 | 3/2006 | King |
| 2006/0155407 A1 | 7/2006 | Azuma |
| 2007/0283322 A1 | 12/2007 | Hsu |
| 2008/0077902 A1 | 3/2008 | Harashima |
| 2009/0005928 A1 | 1/2009 | Sells |
| 2009/0276698 A1 * | 11/2009 | Clarke ............... G06F 40/194 715/255 |
| 2011/0029504 A1 | 2/2011 | King |
| 2011/0145187 A1 | 6/2011 | Himmelsbach |
| 2013/0332464 A1 | 12/2013 | King |

OTHER PUBLICATIONS

Tomas R. Ervolina et al., Simulating Order Fulfillment with Product Substitutions in an Assemble-to-Order Supply Chain, Proceedings of the 2006 Winter Simulation Conference, 2006 IEEE.

Lihong Qiao et al., Implementation approach to information integration between PDM and ERP systems, Journal of Beijing University of aeronautics and Astronautics, vol. 34. No. 5, 587-591, May 2008.

* cited by examiner

BILL OF MATERIAL SYNCHRONIZATION

BACKGROUND

Aspects of the present invention relate in general to bill of material processing systems, and more particularly, to a method and system for verifying bills of material between two separate systems based on an update to one of the systems.

A bill of material is a list of components and parts needed to manufacture a particular product. For example, to produce products, a company may employ personnel for both an engineering department and a manufacturing department. Engineering departments often use a product development system to manage the products they design and the parts needed to build the products. Manufacturing departments often use a type of enterprise planning system to aid the procurement of materials and machinery to manufacture various products.

The design of a product may often be updated, even if that product is currently being manufactured. The engineering department may make changes to a bill of material for a particular product by issuing an engineering change order (ECO). The change order may indicate a change in materials to be used for a particular range of product serial numbers or date range. Because various changes to a bill of material may issue for different ranges of product serial numbers, it can be difficult to make sure that the bills of material from the engineering department systems match the bills of material from the manufacturing department systems. Additionally, many other types of systems may need to interact with the bill of material. Thus, the complexity of updating and verifying a bill of material between multiple systems may increase.

BRIEF SUMMARY

A method performed by a physical computing system configured to synchronize a source bill of material with a target bill of material includes receiving a tree structure representing the source bill of material with the physical computing system; receiving a tree structure representing the target bill of material with the physical computing system; in response to a determination by the physical computing system that a revision has been applied to a source node from the tree structure representing the source bill of material since a corresponding target node from the tree structure representing the target bill of material was last updated, calculating a change from the source node to the target node with the physical computing system; and updating, with the physical computing system, the target node with the revision if the calculated change matches a difference provided by a revision history associated with the source bill of material.

A method performed by a physical computing system configured to synchronize a source bill of material with a target bill of material includes receiving a tree structure representing the source bill of material with the physical computing system; receiving a tree structure representing the target bill of material with the physical computing system; in response to a determination by the physical computing system that multiple revisions have been applied to a source node from the tree structure representing the source bill of material since a corresponding target node from the tree structure representing the target bill of material was last updated, creating a copy of the target node and revising the copy of the target node based on a revision history associated with the source bill of material; and updating, with the physical computing system, the target node with the revisions if the revised copy of the target node matches the source node.

A physical computing system comprising a processor and a memory communicatively coupled to the processor. The processor is configured to receive a tree structure representing the source bill of material; receive a tree structure representing the target bill of material; calculate a change from the source node to the target node with the physical computing system in response to a determining that a revision has been applied to a source node from the tree structure representing the source bill of material since a corresponding target node from the tree structure representing the target bill of material was last updated; and update the target node with the revision if the calculated change matches a difference provided by a revision history associated with the source bill of material.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification relates to systems and methods for synchronizing a bill of material between two systems. For example, when an engineering department makes a change to the design of a product and thus direct that the product be manufactured using a different part or component, it will issue a change order to update a bill of materials associated with the product. The updated bill of materials may then need to be synchronized with a corresponding bill of materials maintained by another system which may use the bill of material such as a manufacturing department system.

According to certain illustrative embodiments of the systems and methods described herein, a source bill of material may be retrieved from a first computing system such as a source system. A target bill of material may also then be retrieved from a second computing system such as a target system. Each bill of material may be represented as a tree structure. However, the embodiments of the methods described here involve only one level of the tree at a time. If it is determined that there is a difference between the source bill of material and the target bill of material for a given level within a tree, then a calculation function may be applied to calculate which changes have taken place since the target bill of material was last synchronized with the source bill of material. A recursion function may be used to process changes and updates to multiple levels within the tree structure. These calculated changes may then be compared to the changes indicated by a history of changes stored in the source system. If both changes match, then the target bill of material can be updated accordingly.

A system embodying principles described herein may provide accurate synchronization by efficiently and automatically verifying the data between the source bill of material and the target bill of material. The bill of material may be an engineering bill of material, a manufacturing bill of material, or any other type of bill of material. Thus, the appropriate updates may be applied to bring the target systems up-to-date according to the source system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "bill of material" is to be broadly interpreted as a set of parts and components needed to manufacture a given product. The term "source bill of material" may refer to a bill of material which is presumed to be up-to-date. The term "target bill of material" may refer to a bill which is presumed to be in need of an update.

Throughout this specification and in the appended claims, the term "product serial number" may refer to a unique number given to each manufacture of a given product. This number may be used to identify and track the manufacturing process of all manufactures of a given product.

Figure 1:
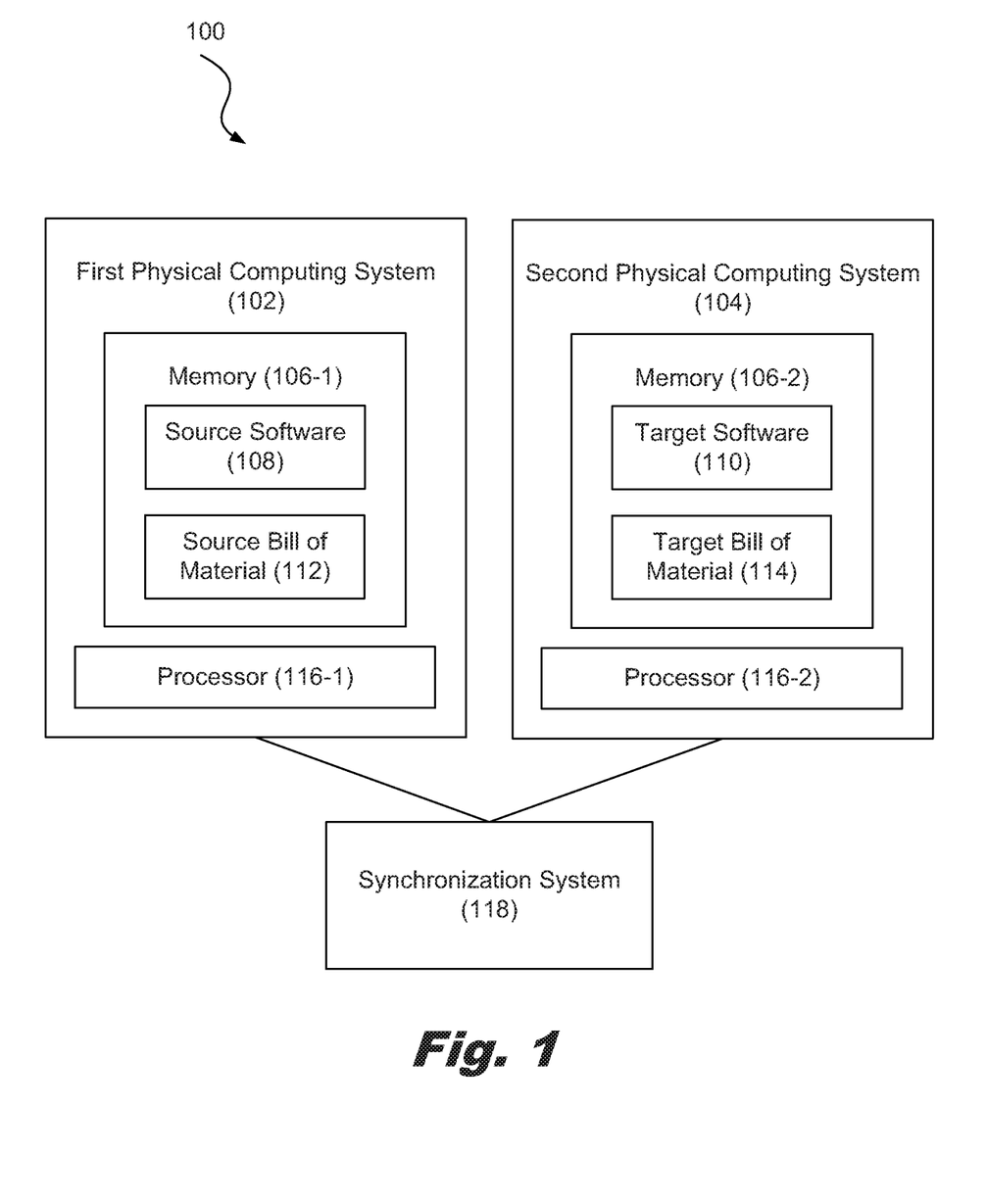
FIG. 1 is a diagram showing an illustrative first physical computing system and a second physical computing system, according to one embodiment of principles described herein.

Referring now to the figures, FIG. 1 is a diagram (100) showing an illustrative first physical computing system (102) and a second physical computing system (104). According to certain illustrative embodiments, both physical computing systems (102, 104) may include memory (104) and a processor (116). The memory (106-1) associated with the first physical computing system may have source software (108) and a source bill of material (112) stored thereon. Additionally, the memory (106-2) associated with the second physical computing system (104) may have target software (110) and a target bill of material (114) stored thereon. Both the first physical computing system (102) and the second physical computing system (104) may be connected to a synchronization system (118).

A physical computing system comprises memory (106). There are many types of memory available. Some types of memory, such as hard disk drives, optical disc drives, and solid state drives, are optimized for storage. Other types of memory, such as those used for Random Access Memory (RAM), are optimized for speed and are often referred to as "working memory." The various forms of memory may store information in the form of data and software. Software may be defined as a set of instructions for a processor (116) which are stored in some form of memory (106).

As mentioned above, a business may use two separate systems for their operations. For example, the engineering department may use Product Data Management (PDM) software. Additionally, the manufacturing department may use Enterprise Resource Planning (ERP) software. By way of illustration, the source software (108) associated with the first physical computing system (102) may be used by an engineering department. Furthermore, the target software (110) associated with the second system may be used by a manufacturing department.

In one example, the engineering department may make a change to a bill of material in response to a design change. The source bill of material (112) is updated through use of the source software (108). The target bill of material (114) may then need to be updated in accordance with the newly changed source bill of material.

In certain embodiments, a synchronization system (118) may be used to perform the functions necessary to update and verify a bill of material between two systems (102, 104). In some embodiments, the synchronization system may be integrated with a system maintaining a source bill of material (112) or a system maintaining a target bill of material (114). A synchronization system may be any physical computing system capable of performing the processes involved in updating bills of material.

Figure 2A:
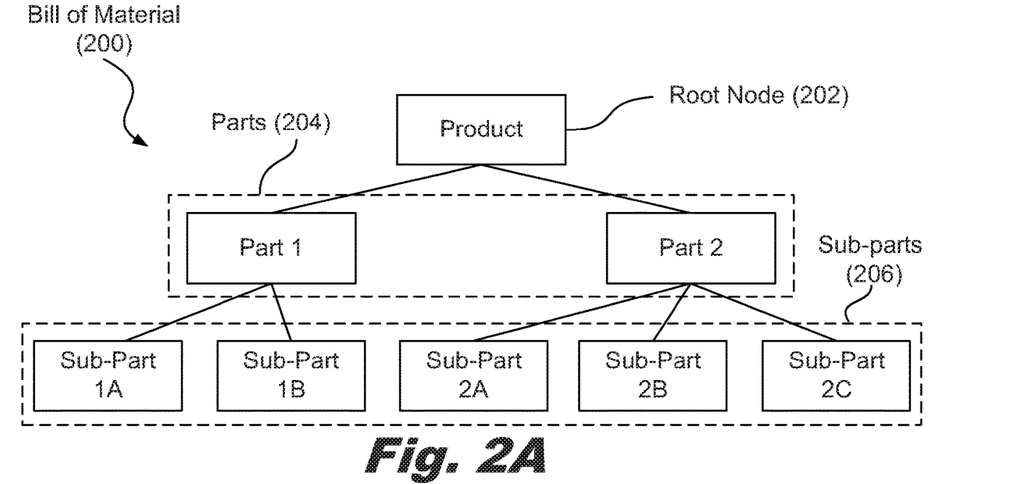
FIGS. 2A-2C are diagrams showing how data may be organized within an illustrative bill of material, according to one embodiment of principles described herein.
Figure 2B:
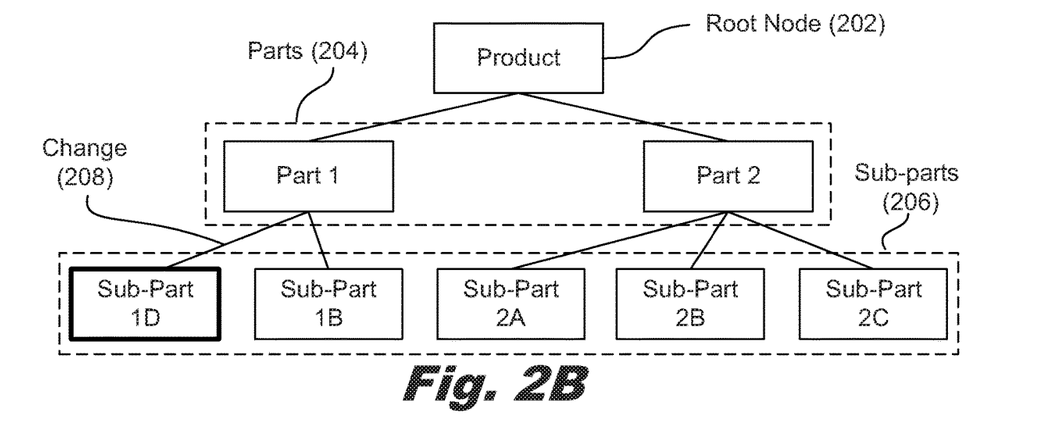
Figure 2C:
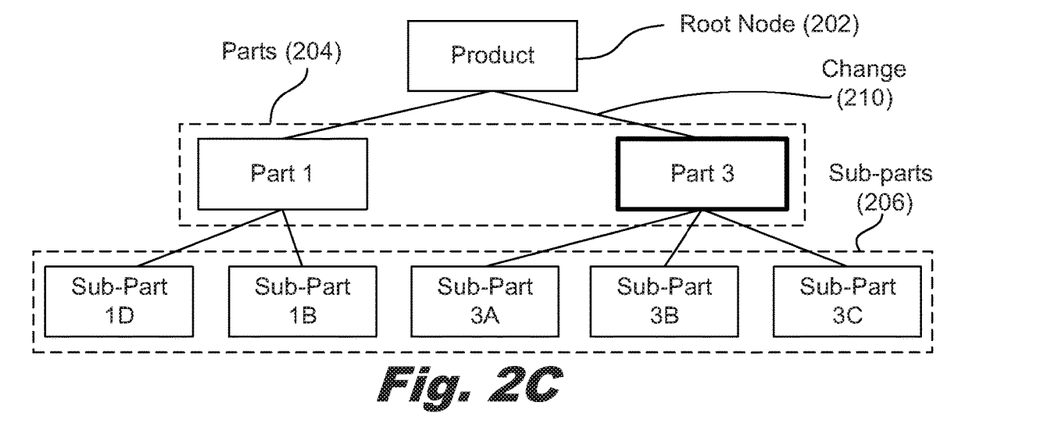

FIGS. 2A-2C are diagrams showing how data may be organized within an illustrative bill of material (200). According to certain embodiments, a bill of material (200) may be represented as a tree structure. The root node (202) may indicate a finished product. The child nodes of the root node (202) may make up the various parts (204) needed to manufacture the finished product. The child nodes of the part nodes may represent subparts (206) needed to manufacture the parts (204).

FIG. 2A is a diagram showing a simple illustration of an illustrative tree structure representing a bill of material (200). The finished product represented by this tree structure is made of two parts (204), part 1 and part 2. Part 1 is made of two subparts (206), subpart 1A and subpart 1B. Part 2 is made of three subparts (206), subpart 2A, subpart 2B, and subpart 2C.

FIG. 2B is a diagram showing the bill of material after an engineering order has been applied to change (208) one of the subparts. Subpart 1A has been replaced with subpart 1D. It may be the case that this change applies to a specified range of product serial numbers or a specified date range. This range may be indicated by the engineering change order that caused the change (208).

FIG. 2C is a diagram showing the bill of material (200) after a change order has been applied to change one of the parts (204). Part 2 has been changed to part 3. Part 3 contains a new set of subparts (206), subpart 3A, subpart 3B, and subpart 3C. Again, this type of change (208) may be implemented with an engineering change order. The change may also apply to a specific range of product serial numbers.

In some cases, one engineering team may make a change to the bill of material for a certain sub-part (206). A second engineering team may then make a change to a sub-part (206) of a different part (204). If the system were to simply replace the entire target bill of material with the source bill of material in response to the second engineering team making the change, then the changes made by the first engineering team may be erased. Thus, it is important that the system verify and update the various portions of a bill of material appropriately.

Figure 3A:
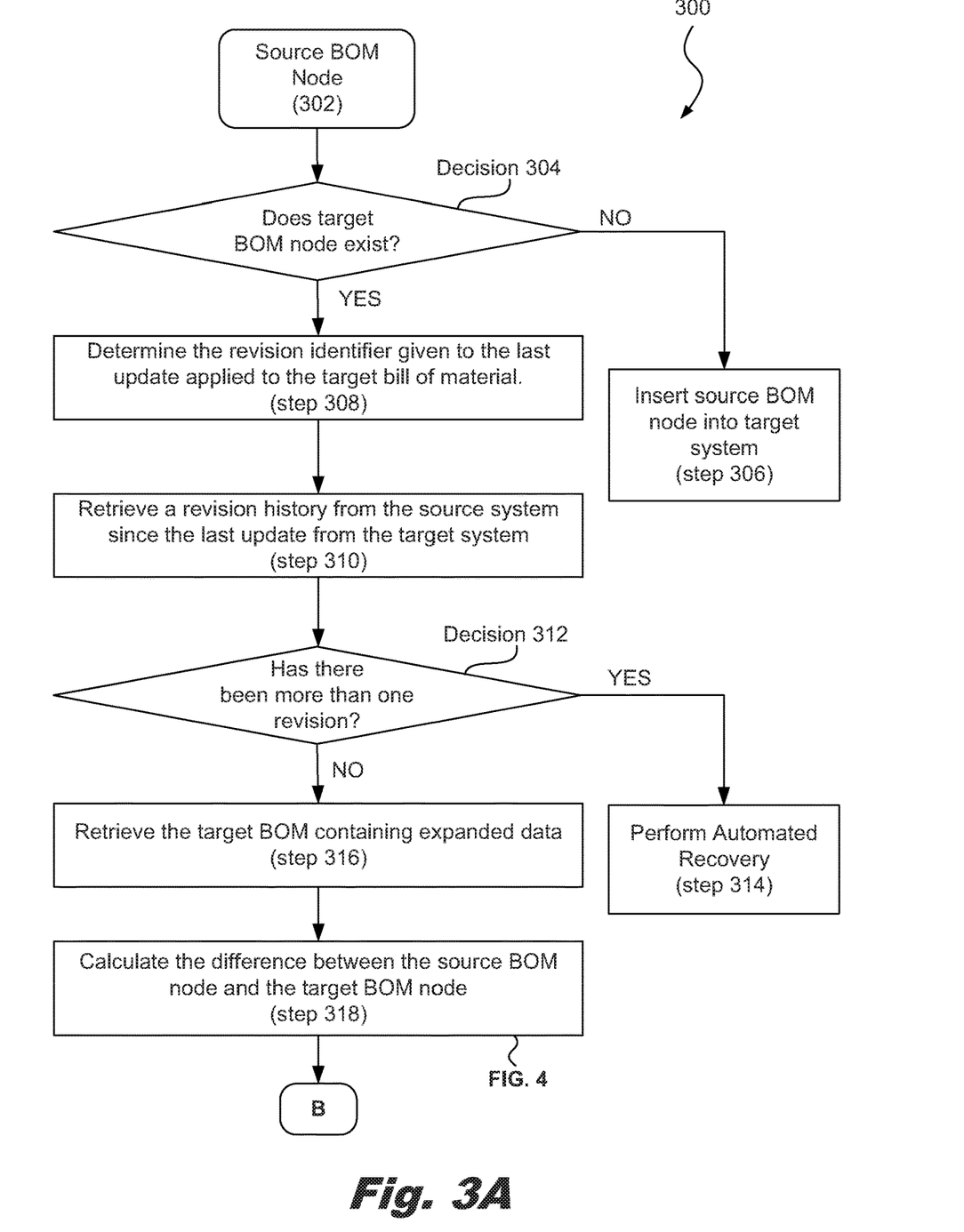
FIGS. 3A and 3B are diagrams showing an overview of an illustrative process for synchronizing a bill of material between two systems, according to one embodiment of principles described herein.
Figure 3B:
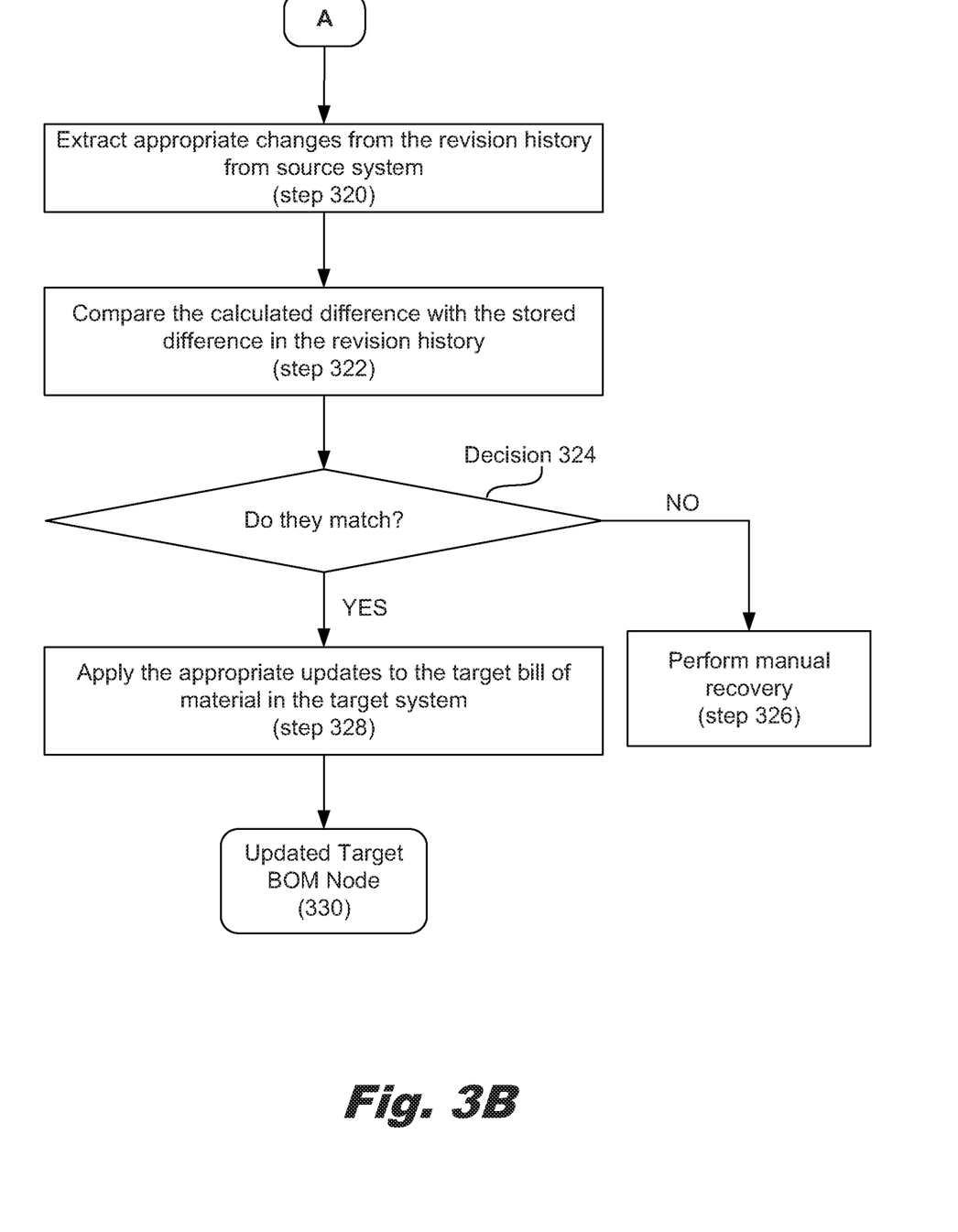

FIGS. 3A and 3B are diagrams showing an overview of an illustrative process (300) for synchronizing a bill of material between two systems. According to certain illustrative embodiments, the changes between a source bill of material for a given range of identifying numbers and a target bill of material may be calculated and then compared with a revision history provided by the source system. Identifying numbers may include product serial numbers, dates, and lot numbers. If the calculated changes match the changes indicated by the revision history, then the target bill of material may be updated.

An illustration of the process (300) starts in FIG. 3A with a node (302) from the source bill of material (302) for a given range of identifying numbers. The system then checks (decision 304) to see if there is a corresponding node in the target bill of material. If a corresponding node in the target bill of material does not exist (NO, decision 304), then the node from the source bill of material may be simply inserted (step 306) into the target system. If a corresponding node from the target bill of material does indeed exist (YES, decision 304), then the system may proceed to the next step of the process (300, where it determines (step 308) the revision number given to the last update applied to the target bill of material. The system may then retrieve (step 310) a revision history from the source system. The revision history may include the revisions made since the bill of material was last synchronized with the target system. Many systems maintain a record of each change made to a bill of material from a particular system. The revision history of the source bill of material may indicate which changes have been made to the source bill of material since the target bill of material was last updated.

In some cases, there may have been several updates applied to the source bill of material since the target bill of material was last synchronized with the source bill of material. The system may then check (decision 312) to see if more than one revision has been applied to the source bill of material since the target bill of material was last synchronized with the source bill of material. If it is determined (YES, decision 312) that there has been more than one revision, then the system may apply a function to automatically recover from the past updates. In one embodiment, a user may manually review the changes from the source system to determine that they are appropriate.

If it is determined (NO, decision 312) that there has been only one revision since the target bill of material was updated from the source bill of material, then the system may proceed by retrieving (step 316) the target bill of material containing expanded data. The expanded data includes data from each child node for all possible effectivity ranges of the source node in question. The effectivity range may be defined as a range of identifying numbers including, but not limited to, product serial numbers, dates, or lot numbers. This data may be used to calculate (step 318) the difference between the node from the source bill of material and the corresponding node from the target bill of material. A more detailed view of the calculation process is described below with an illustration accompanied in FIG. 4.

The illustration of the process (300) then continues in FIG. 3B. The system may then extract (step 320) the changes made since the last revision and compare (step 322) them with the calculated changes that were derived in step 318. If it is determined (NO, decision 324) that the extracted changes and the calculated changes do not match, then a manual recovery process may be performed (step 326). This manual recovery may involve a person searching through the data to find out why the data does not match. If it is determined (YES, decision 324) that the extracted changes and the calculated changes do indeed match, then the system may proceed to the next step.

Once the system has verified that the calculated changes match the changes derived from the supplied revision history, the appropriate updates may be applied (step 328) to the target bill of material stored on the target system. The target system may then contain an accurately updated precise set of data for the target bill of material (330).

Figure 4:
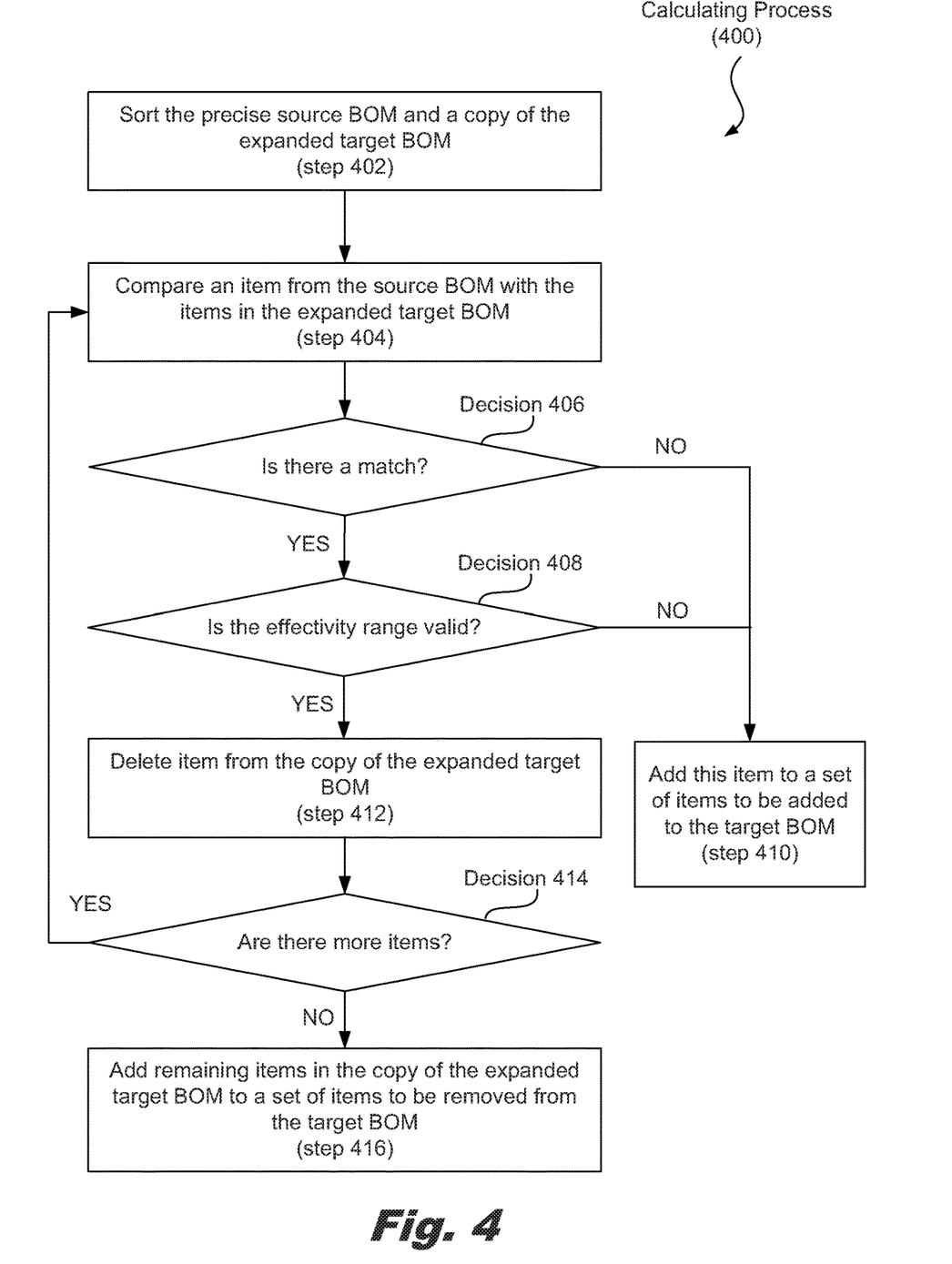
FIG. 4 is a diagram showing a calculating process for determining the difference between two bills of material, according to one embodiment of principles described herein.

FIG. 4 is a diagram showing a calculating process (400) for determining the difference between a source bill of material and a target bill of material. According to certain illustrative embodiments, the calculating process determines a set of items, if any, which need to be added to a target bill of material and a set of items, if any, which need to be removed from a target bill of material.

An illustration of the process starts at the top of FIG. 4. The system may be configured to sort (step 402) the data from the source bill of material containing information from a given range of product serial numbers, dates, or lot numbers. The system may also create and sort a copy of the target bill of material. The sorting may be done according to a desired criteria including, but not limited to, part number, item number, quantity and unit of measure. The copy of the target bill of material may be created for the purpose of performing operations on the copy without permanently affecting the stored copy on the target system.

The system may be configured to go through each item from the source bill of material and compare (step 404) each item with the items in the expanded target bill of material. If it is determined (NO, decision 406) that there is not a match between a given item in the source bill of material and an item in the target bill of material, then the given item may be added (step 410) to a set of items which will be added to the updated node in the target bill of material. If it is determined (YES, decision 406) that there is indeed a match between a given item in the source bill of material and an item in the target bill of material, then the system may check (decision 408) to see if the effectivity range for those items match. Two items may be identified as a match if it meets one of the criteria described above.

An effectivity range may refer to a range or set of ranges of product serial numbers, dates, or lot numbers for which a certain part within a bill of material is valid. For example, an engineering order may specify that products with a serial number 10 and up are to start using part 3 instead of part 2 which was used for products with serial numbers 1 through 9. If it is determined (NO, decision 408) that the effective ranges do not match, then the given item may be added (step 410) to the set of items which will be added to the updated node in the target bill of material. If the system determines (YES, decision 408) that the effective ranges for the matched node in both the source target bill and the target bill of material overlap, then the system may proceed by deleting (step 412) the given item from the copy of the expanded target bill of material.

The system may then determine (decision 414) if there are any more items in the source bill of material which need to be compared with the items in the target bill of material. If it is determined (YES, decision 414) that there are indeed more items which need to be compared, the system may return to step 404 and compare the next item. If it is determined (NO, decision 414) that there are no more items left to be compared, then the system may add any items remaining in the copy of the target bill of material to a set of items to be removed from the final target bill of material.

Figure 5:
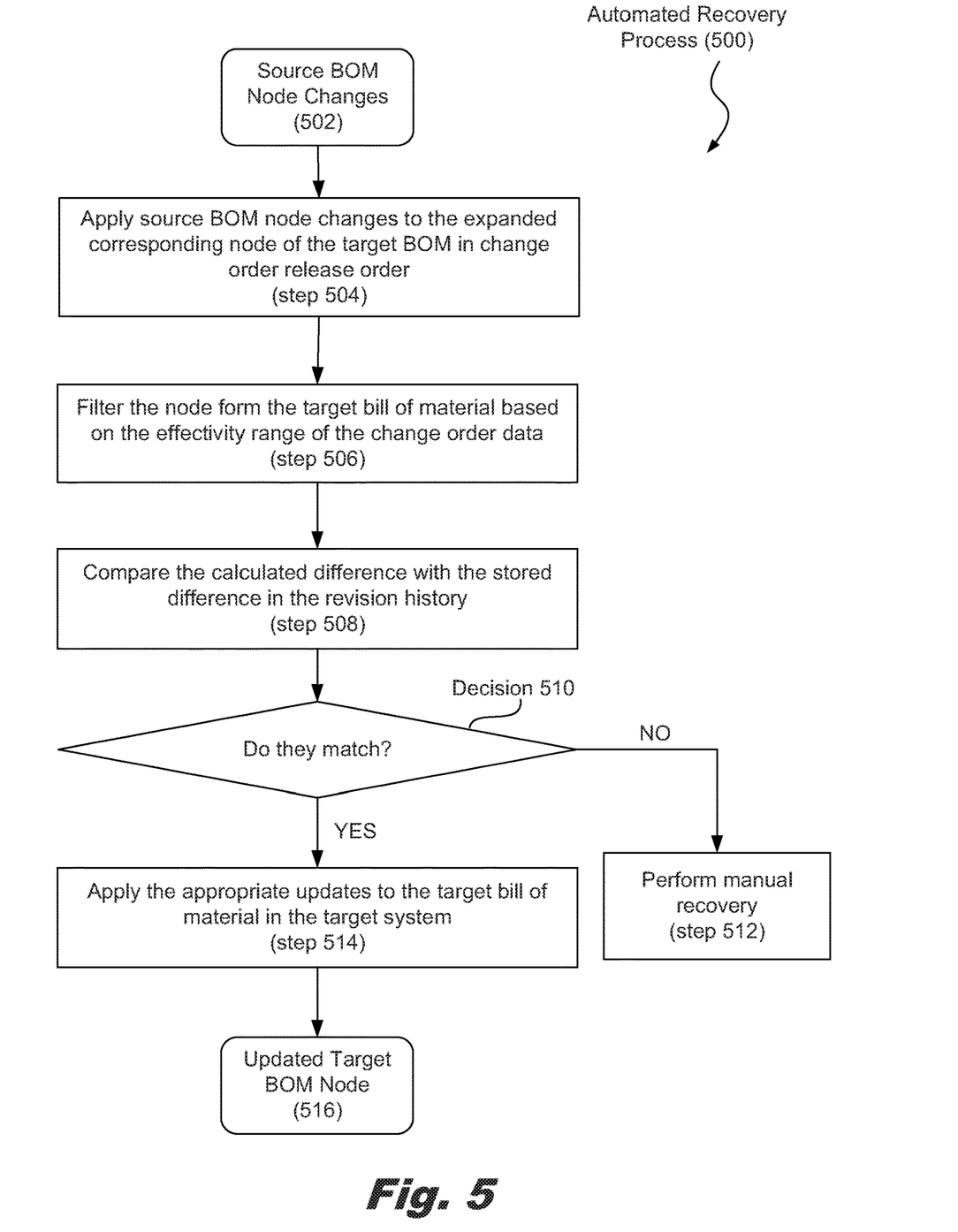
FIG. 5 is a diagram showing an automated recovery process when more than one revision has taken place between a last synchronization, according to one embodiment of principles described herein.

FIG. 5 is a diagram showing an automated recovery process (500) when more than one revision has taken place between a last synchronization. According to certain embodiments, the stored changes made to a node from a source bill of material may be used to calculate what the node from the target bill of material should be when applied in chronological order. The calculated node for the target bill of material may then be compared with the node from the source bill of material. If there is a match, then the target bill of material may be updated accordingly.

The process (500) of FIG. 5 begins with a list of changes (502) which have been applied to a node from a source bill of material since the corresponding node in the target bill of material was last synchronized. The changes may then be applied (step 504) to a corresponding node from the target bill of material which includes the expanded data for that node. The change orders may be applied in the order in which they were released. These changes may be applied to a copy of the target node in a working memory, thus the changes are not being made to the actual target node maintained by the target system. The node from the target bill of material may then be filtered (step 506) based on the effective ranges associated with the change orders.

The system may then compare (step 508) the calculated changes that were derived through steps 504 and 506 with the data extracted from the node from the source bill of material. If it is determined (NO, decision 510) that the extracted changes and the calculated changes do not match, then a manual recovery process may be performed (step 512). This manual recovery may involve a person searching through the data to find out why the data does not match. If it is determined (YES, decision 510) that the extracted changes and the calculated changes do indeed match, then the system may proceed to the next step.

Once the system has verified that the data from the source system matches the calculated changes from the target system, the appropriate updates may be applied (step 514) to the target bill of material stored on the target system. The target system may then contain an accurately updated precise set of data for the target bill of material (516).

Figure 6:
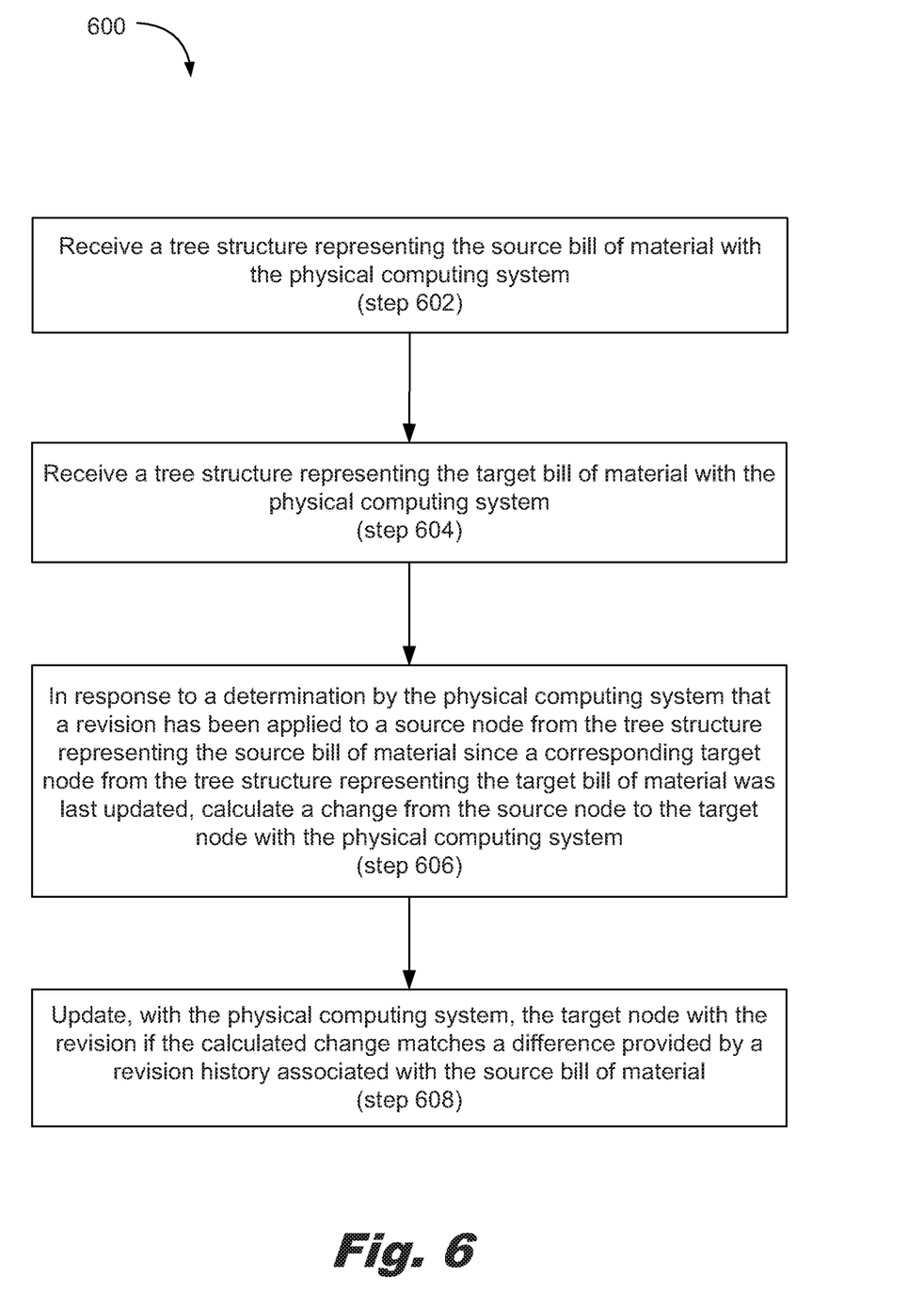
FIG. 6 is a flowchart showing an illustrative method for synchronizing a bill of material between two systems when one revision has been applied since the last time the systems were synchronized, according to one embodiment of principles described herein.

FIG. 6 is a flowchart showing an illustrative method for synchronizing a bill of material between two systems when one revision has been applied since the last time the two systems were synchronized. According to certain illustrative embodiments, a method performed by a physical computing system configured to synchronize a source bill of material with a target bill of material includes receiving (step 602) a tree structure representing the source bill of material with the physical computing system, receiving (step 604) a tree structure representing the target bill of material with the physical computing system, in response to a determination by the physical computing system that a revision has been applied to a source node from the tree structure representing the source bill of material since a corresponding target node from the tree structure representing the target bill of material was last updated, calculating (step 606) a change from the source node to the target node with the physical computing system, and updating (step 608), with the physical computing system, the target node with the revision if the calculated change matches a difference provided by a revision history associated with the source bill of material.

Figure 7:
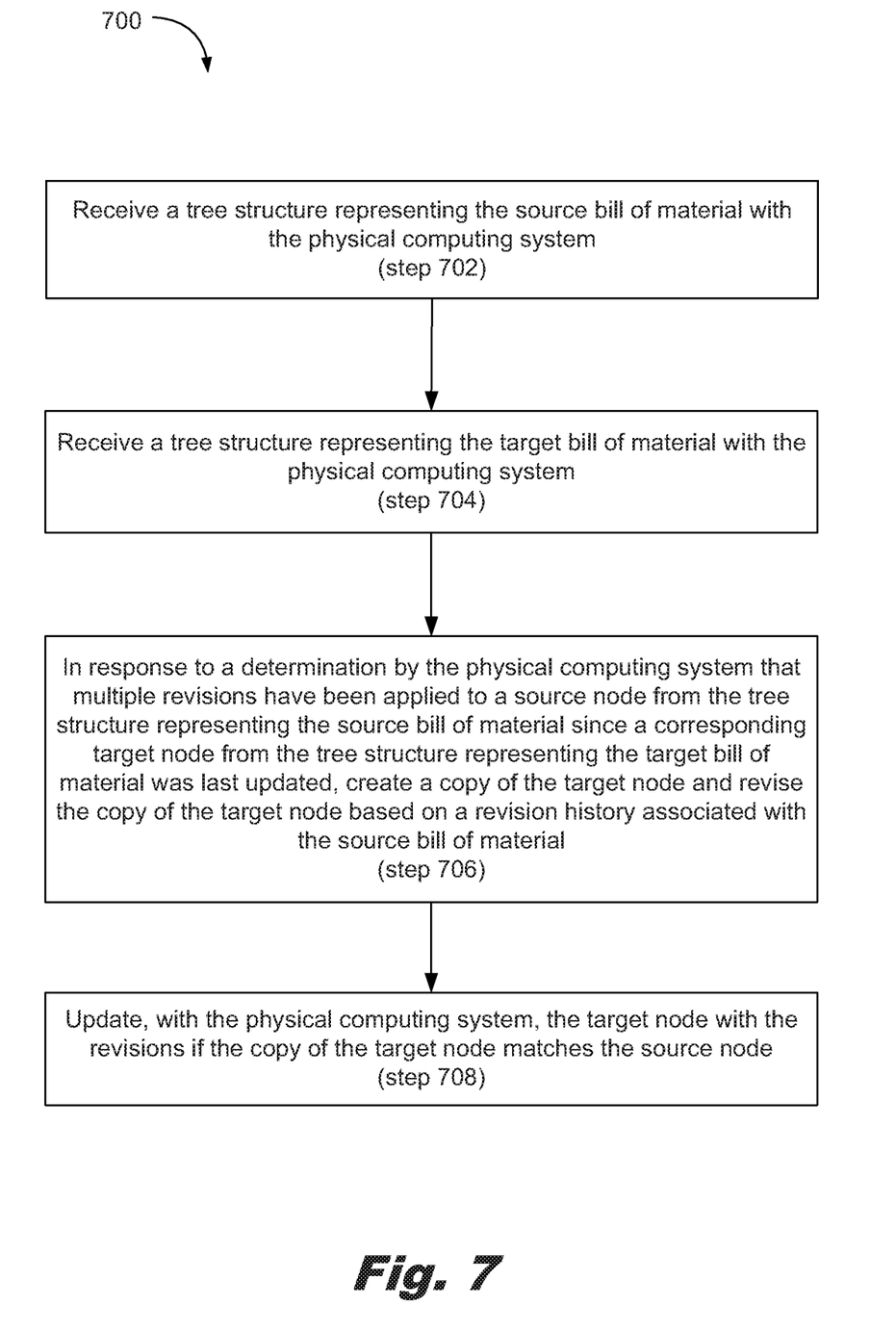
FIG. 7 is a flowchart showing an illustrative method for synchronizing a bill of material between two systems when multiple revisions have been applied since the last time the systems were synchronized, according to one embodiment of principles described herein.

FIG. 7 is a flowchart showing an illustrative method for synchronizing a bill of material between two systems when multiple revisions have been applied since the last time the systems were synchronized. According to certain embodiments, a method performed by a physical computing system configured to synchronize a source bill of material with a target bill of material includes receiving (step 702) a tree structure representing the source bill of material with the physical computing system, receiving (step 704) a tree structure representing the target bill of material with the physical computing system, in response to a determination by the physical computing system that multiple revisions have been applied to a source node from the tree structure representing the source bill of material since a corresponding target node from the tree structure representing the target bill of material was last updated, creating (step 706) a copy of the target node and revising the copy of the target node based on a revision history associated with the source bill of material, and updating (step 708), with the physical computing system, the target node with the revisions if the copy of the target node matches the source node.

According to certain embodiments, the physical computing system performing the process of synchronizing the source bill of material with the target bill of material may be either the system managing the target bill of material or the system managing the source bill of material. In some cases, a separate computing system may be communicatively connected to either system and perform the synchronization process.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method performed by a physical computing system configured to synchronize a source bill of material at a first location in a computer network with a target bill of material at a second, different location in the computer network, the method comprising;
   in response to a determination by said physical computing system that multiple revisions have been applied to a source node from a tree structure representing said source bill of material since a corresponding target node from a tree structure representing said target bill of material was last updated, creating a copy of said target node and revising said copy of said target node with revisions based on a revision history associated with said source bill of material;
   updating over the network, with said physical computing system, said target node with said revisions if the revised copy of said target node matches said source node; and
   manufacturing a product based on said target bill of materials, wherein said target bill of materials is now accurate with respect to said source bill of materials.

2. The method of claim 1, wherein each node in said tree structure representing said source bill of material and each node in said tree structure representing said target bill of material is associated with a range of one of: product serial numbers, dates, and lot numbers.

3. The method of claim 1, wherein said revisions comprise change orders associated with said revision history to said copy of said target node, said revisions being applied in a reverse order of said change orders.

4. The method of claim 3, further comprising filtering said revision history for said copy of said target node based on an effectivity range for said target node and each descendant node of said target node in said tree structure representing said target bill of materials.

5. The method of claim 3, wherein filtering said revision history comprises filtering an effectivity range from an item in said source node.

6. The method of claim 1, wherein said creating and revising said copy of said target note and said updating said target node are performed recursively for each node in said tree structure representing said target bill of material.

7. The method of claim 1, wherein said tree structure representing said source bill of material is associated with a product data management system.

8. The method of claim 1, wherein said tree structure representing said target bill of material is associated with an enterprise resource planning system.

9. A method performed by a synchronization system incorporated in a physical computing system programmed to synchronize a source bill of material stored on a first networked physical computing system with a target bill of material stored on a second, separate networked physical computing system, the method comprising:

with the physical computing system, monitor said source bill of material at said first networked physical computing system for revisions;

in response to a determination by said physical computing system that multiple revisions have been applied to a source node from a tree structure representing said source bill of material at said first networked physical computing system after a corresponding target node from a tree structure representing said target bill of material at said second networked physical computing system was last updated, creating a copy of said target node and revising said copy of said target node with revisions based on a revision history associated with said source bill of material; and synchronizing the two bills of material by updating, with said physical computing system, said target node at said second networked physical computing system with said revisions only when the revised copy of said target node matches said source node, so that manufacturing that is based on said target bill of materials located at said second networked physical computing system is accurate with respect to said source bill of materials located at said first networked physical computing system.

10. The method of claim 9, wherein each node in said tree structure representing said source bill of material and each node in said tree structure representing said target bill of material is associated with a range of one of: product serial numbers, dates and lot numbers.

11. The method of claim 9, further comprising:

removing each item from said copy of said target node which matches an item in said source node;

wherein items left in said copy comprise a set of items to be removed from said target node and items from said source node which do not match any item in said copy comprise a set of items to be added to said target node.

12. The method of claim 11, wherein removing each said item from said copy which matches an item in said source node also requires that said item from said copy has an effective range that matches an effective range from said item in said source node.

13. The method of claim 9, wherein copying said target note and updating said target node are performed recursively for each node in said tree structure representing said target bill of material.

14. The method of claim 9, wherein said tree structure representing said source bill of material is associated with a product data management system.

15. The method of claim 9, wherein said tree structure representing said target bill of material is associated with an enterprise resource planning system.

* * * * *